United States Patent … (10) Patent No.: US 7,602,577 B1
Kose et al. (45) Date of Patent: Oct. 13, 2009

(54) RAPID OFF TRACK DETECTION USING IN-DRIVE MICROACTUATOR

(75) Inventors: Rickmer Kose, San Francisco, CA (US); Erhard Schreck, San Jose, CA (US); Frank Obregon, Ripon, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 565 days.

(21) Appl. No.: 11/345,122

(22) Filed: Jan. 31, 2006

Related U.S. Application Data (60) Provisional application No. 60/649,707, filed on Feb. 3, 2005.

(51) Int. Cl.
G11B 27/36 (2006.01)
G11B 5/596 (2006.01)
(52) U.S. Cl. ...................... 360/77.03; 360/31
(58) Field of Classification Search ........................ None
See application file for complete search history.

(56) References Cited

U.S. PATENT DOCUMENTS

| | | | |
|---|---|---|---|
| 6,538,839 B1 * | 3/2003 | Ryan | 360/77.02 |
| 6,600,619 B1 * | 7/2003 | Morris et al. | 360/75 |
| 6,600,622 B1 | 7/2003 | Smith | |
| 6,781,780 B1 * | 8/2004 | Codilian | 360/60 |
| 6,882,489 B1 | 4/2005 | Brunnett et al. | |
| 7,253,987 B1 * | 8/2007 | Shim et al. | 360/77.02 |

* cited by examiner

*Primary Examiner*—Joseph H Feild
*Assistant Examiner*—Daniell L Negrón
(74) *Attorney, Agent, or Firm*—David D. Brush; Westman, Champlin & Kelly P.A.

(57) ABSTRACT

A microactuator incorporated within an actuator assembly of a disk drive is used as a detection element for rapid off track events that may occur. Preferably, the microactuator employs one or more piezoelectric elements used for purposes of secondary actuation. Uncontrolled movement of the actuator across the disk results in the piezoelectric elements generating a voltage spike or signal that is analyzed to determine whether a rapid off track event has occurred. Rapid off track events are distinguished from other possible events, such as shock events. If a rapid off track event is detected, then remedial actions are taken to restore data integrity, to include executing restore commands such as rewriting selected data tracks. Dedicated piezoelectric elements may also be provided for detecting rapid off track events wherein these elements are not incorporated in the servo loop that controls positioning of the actuator.

21 Claims, 5 Drawing Sheets

Fig. 1
Prior Art

Non-ROT Event

Fig. 2

ROT Event

RAPID OFF TRACK DETECTION USING IN-DRIVE MICROACTUATOR

CROSS REFERENCE TO RELATED APPLICATION

Priority is claimed from U.S. Provisional Patent Application No. 60/649,707 filed on Feb. 3, 2005, and entitled "Rapid Off Track Detection Using In-Drive Microactuator" and, the disclosure of which is incorporated herein by reference in its entirety.

FIELD OF THE INVENTION

The present invention relates to detecting uncontrolled displacement of an actuator in a disk drive, and more particularly, to detection and remediation of rapid off track events that may occur in a disk drive.

BACKGROUND OF THE INVENTION

Computer disk drives typically incorporate retrieval and storage of data by use of magnetic storage disks and read/write heads that are capable of reading data from and writing data onto the rotating storage disks. Data is stored on each magnetic storage disk in a number of concentric tracks on the disk. The narrower the tracks can be made, the more data that can be stored on the storage disk. The read/write heads may also be referred to as the read/write transducers that are integrated within a slider that typically places the heads at a predetermined height above the corresponding storage disk. One or more read/write heads may be integrated within a single slider. A suspension assembly supports the slider over the disk and maintains the slider over the desired data track center line during a read or write operation. A cushion of air is generated between the slider and the rotating disk, the cushion often referred to as an air bearing. The suspension assembly is part of the actuator that is the component in the disk drive for positioning the read/write heads. The actuator is typically controlled by a voice coil motor that acts as a primary actuator for positioning of the slider over the desired track. Because of the trend in recent years to provide greater storage capacity on a storage disk, track widths have become increasingly narrower which makes it more difficult for the read/write heads to accurately read and write information to and from the magnetic disks. The actuator has limited ability to accurately position a slider across the data tracks. Accordingly, a need has arisen over the years for the ability to more accurately position the read/write heads on tracks of decreasing width. As track density increases, the speed or servo bandwidth with which an actuator can respond must also increase to allow effective track following.

One approach to achieving finer positioning of the actuator is to employ secondary actuation that operates together with primary actuation provided by the voice coil motor. Secondary actuation can be provided in the form of an additional actuator element that enables enhanced control of the flexure and/or load beam. These additional control elements are often referred to as "micro" or "milli" actuators.

It is well known that a shock event resulting in actuator displacement can cause a read/write error. Because of the increased track densities found on most disks, inadvertent displacement of the actuator for any reason may have a greater deleterious effect since more tracks may be affected by the inadvertent displacement.

Rapid off track (ROT) events may be generally characterized as unpredictable and sporadic displacements of an actuator assembly, but not caused by a shock event in which there may be contact of the slider with the disk. One example of a ROT event includes movement of the actuator assembly due to spontaneous stress relief of one or more elements within the actuator assembly. Another example of a ROT event includes inadvertent movements created by transients in the voice coil motor power supply. More specifically, the transients in the power supply create an electromagnetic force (EMF) on the yoke that carries the voice coil, thus resulting in inadvertent and unpredictable actuator movement.

While the amplitude of a ROT event may be unpredictable, through observation and testing, it has been found that the great majority of all ROT events occur within a one millisecond duration and further, such ROT events have a frequency of between about 10-30 kilohertz. As compared to shock events, ROT events are of a much higher frequency and of a significantly shorter duration. For example, a shock event resulting in contact of read/write heads against the disk typically has a duration of at least 3-4 milliseconds, and the frequency is typically between about 1-3 kilohertz. Additionally, through observation it has been found that ROT events cause lateral actuator displacement with negligible vertical displacement, while most non-ROT events have a significant vertical displacement component.

One reference that discloses a system and method for detecting displacement of disk drive heads mounted on microactuators due to contact with disks is the U.S. Pat. No. 6,600,622. More specifically, this reference discloses a disk drive with a detector circuit connected to a distal end of a two-stage actuator. The actuator includes a microactuator for fine track positioning of read/write heads relative to a disk. Intermittent contact between the head and the disk produces forces that are detected and measured by the microactuator drive circuitry. The measurements are used to determine if excessive contact is occurring between the head and the disk. A signal from the microactuator is used to electronically detect slider/disk contact. The microactuator may be piezoelectric or voice coil based, and capable of generating a signal in response to an applied force or displacement.

While this reference may be adequate for its intended purpose, there is still a need for detection and remedial actions to be taken with respect to ROT events that are more difficult to detect than shock events. Further, there is a need for remedial actions to be taken including sequential analysis of surrounding disk tracks to confirm the status of data on tracks potentially affected by the ROT event.

SUMMARY OF THE INVENTION

In accordance with the present invention, an apparatus and method are provided for detecting and remediating rapid off track events that may occur during operation of a disk drive. In a preferred embodiment, a microactuator incorporated within an actuator assembly of a disk drive is used as a detection element for ROT events that may occur. Preferably, the microactuator employs one or more piezoelectric elements. Uncontrolled movement of the actuator across the disk results in the creation of a voltage spike or signal that is analyzed to determine whether the same is a ROT event. If a ROT event is detected, then remedial actions are taken to restore data integrity, to include executing restore commands and rewriting data to restore corrupted data as necessary.

The logic or methodology used in detection and remedial actions taken can be incorporated within the disk drive software/firmware, and/or may be incorporated within additional disk drive circuitry to achieve desired functionality.

In the method of the present invention, the voltage signal produced by the microactuator is demodulated, and then processed by one or more filters in a circuit design to determine whether the voltage signal corresponds to a ROT event. If a ROT event is detected, then depending upon the drive mode of the disk drive, remedial actions are taken. If the disk drive is in a read mode, a reading error scan is conducted and if a read error is detected, a retry read command is issued. If the disk drive is in a write mode, a stop write command is issued, a ROT flag is set, and inspection is conducted of data tracks potentially affected by the ROT event. More specifically, data track inspection occurs for at least the track(s) that were being accessed at the time of the ROT. If any track is shown as containing corrupted data, then a sequential inspection is conducted for tracks surrounding the one or more corrupted tracks. The sequential inspection is completed when at least one track is found that does not contain corrupted data. Appropriate commands are issued to the drive based upon the results of the inspection in order to complete the remedial action for each disk track. For corrupted data, commands are issued as necessary in order to recover and/or rewrite data as necessary.

In one aspect of the invention, it can be considered a detection and remediation system for detecting ROT events. In another aspect of the invention, it can be considered an improved disk drive that incorporates the detection and remediation system. The invention also includes the method for detecting and remediating ROT events. Other features and advantages of the invention will become apparent from a review of the following detailed description taken in conjunction with the corresponding drawings.

DETAILED DESCRIPTION OF THE INVENTION

Figure 1:
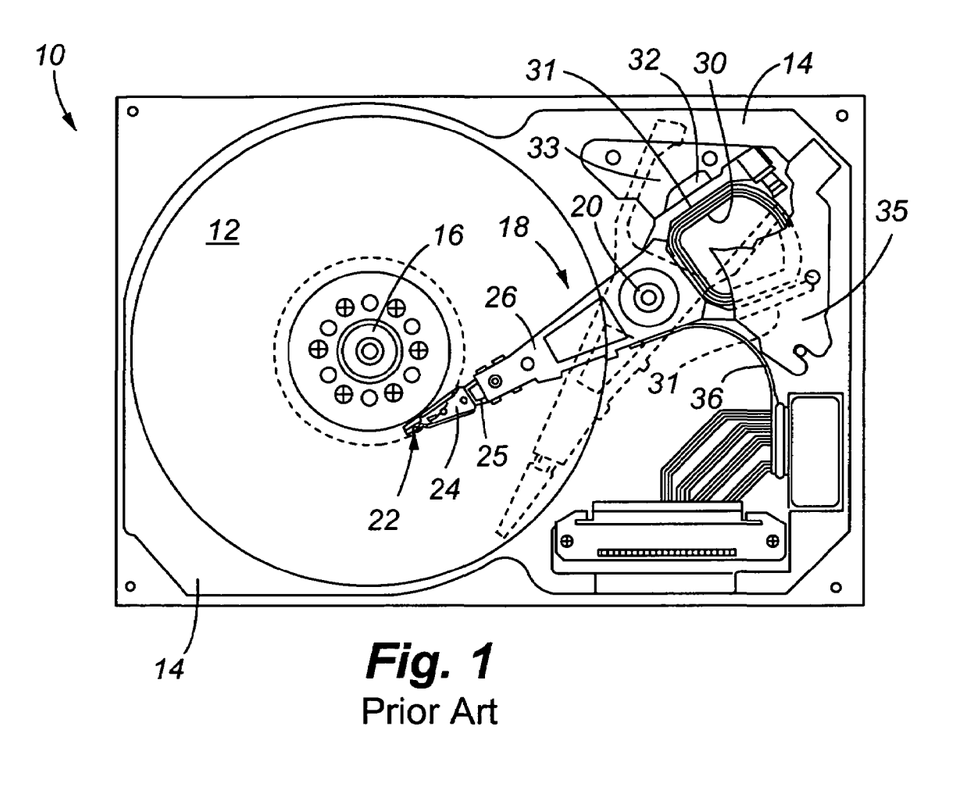
FIG. 1 is a simplified plan view of a standard computer disk drive including an actuator for positioning a slider on a magnetic storage disk.

FIG. 1 shows a plan view of a disk drive assembly 10, with the top cover removed. FIG. 1 is representative of any number of common disk drives. The disk drive assembly as illustrated includes at least one disk 12, typically having magnetic media both on the upper and lower surfaces thereof. The disk 12 along with other components of the disk drive are contained within the housing 14. The disk 12 is mounted over a hub 16 that is driven by a motor (not shown) enabling the disk to rotate at high rotational speeds during operation. An actuator assembly 18 is shown rotatably mounted to an actuator pivot bearing 20. Basic components of the actuator assembly 18 are shown including a slider 22 having one or more read/write heads mounted on a flexure arm or suspension arm assembly 24. The suspension 24 is attached to actuator arm 26 as by a load beam 25. The actuator assembly 18 is rotated to a desired disk track by a voice coil motor including voice coil 30. The voice coil 30 is typically mounted between the yokes 31 of the actuator assembly. The voice coil 30 is immersed in a magnetic field generated by a magnet assembly. The magnet assembly typically includes upper and lower magnets mounted to respective magnet back plates or back irons. In FIG. 1, the upper magnet plate 35 has been broken away thus exposing the lower magnet 32 and lower magnet plate 33. An actuator control circuit causes current flow in the voice coil 30, and ultimately controls the position of the actuator assembly 18 by varying current through the voice coil. FIG. 1 illustrates other common elements of a disk drive including a dynamic communications bus 36 that transfers electronic signals to and from the read/write heads. As discussed below with respect to FIG. 4, a microactuator may be included within the actuator assembly 18 in order to obtain fine positioning of the actuator, the microactuator also serving as a detection element for ROT events.

Figure 2:
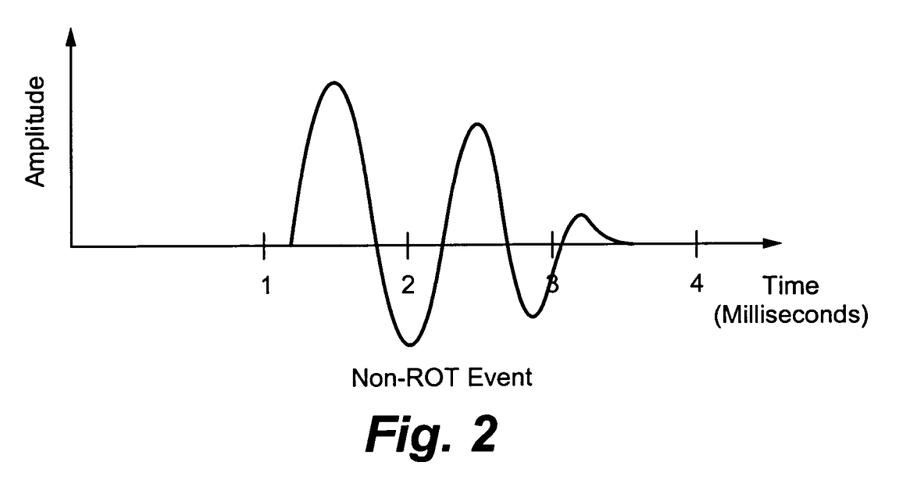
FIG. 2 is a graphical plot of a voltage signal characteristic of a non-ROT event showing the signal plotted as an amplitude over time.
Figure 3:
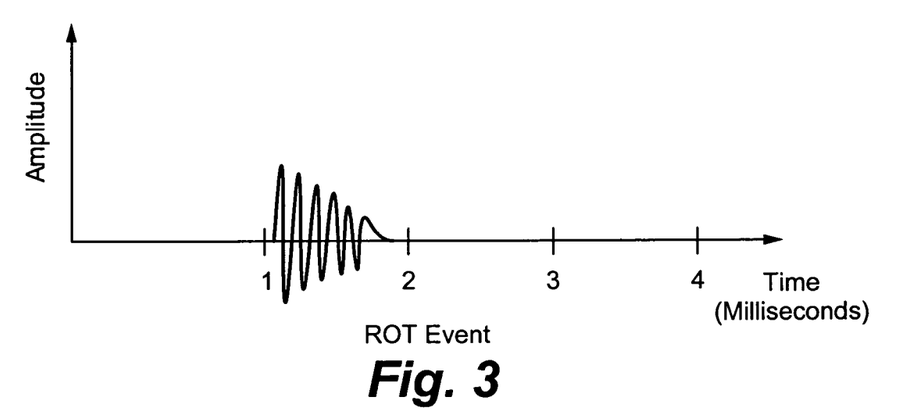
FIG. 3 is a graphical plot of a voltage signal characteristic of a ROT event, also plotted as a function of amplitude over time.

Referring to FIGS. 2 and 3, a typical non-ROT event (FIG. 2) is contrasted with a typical ROT event (FIG. 3). A non-ROT event, such as a shock event resulting in contact of the slider against a disk, is typically one that has a duration of at least 3-4 milliseconds. Additionally, the characteristic frequency of the non-ROT event is typically in the range of 1-3 kilohertz. As shown in the ROT event of FIG. 3, the ROT event typically has a duration of less than or about 1 millisecond, and the characteristic frequency being much higher as compared to a non-ROT event. The frequency of a ROT event is typically in the range of between about 10-30 kilohertz. In FIG. 3, the ROT event is also shown as having a significantly lower amplitude; however, it is more difficult to distinguish among ROT and non-ROT events simply by analysis of amplitude.

Figure 4:
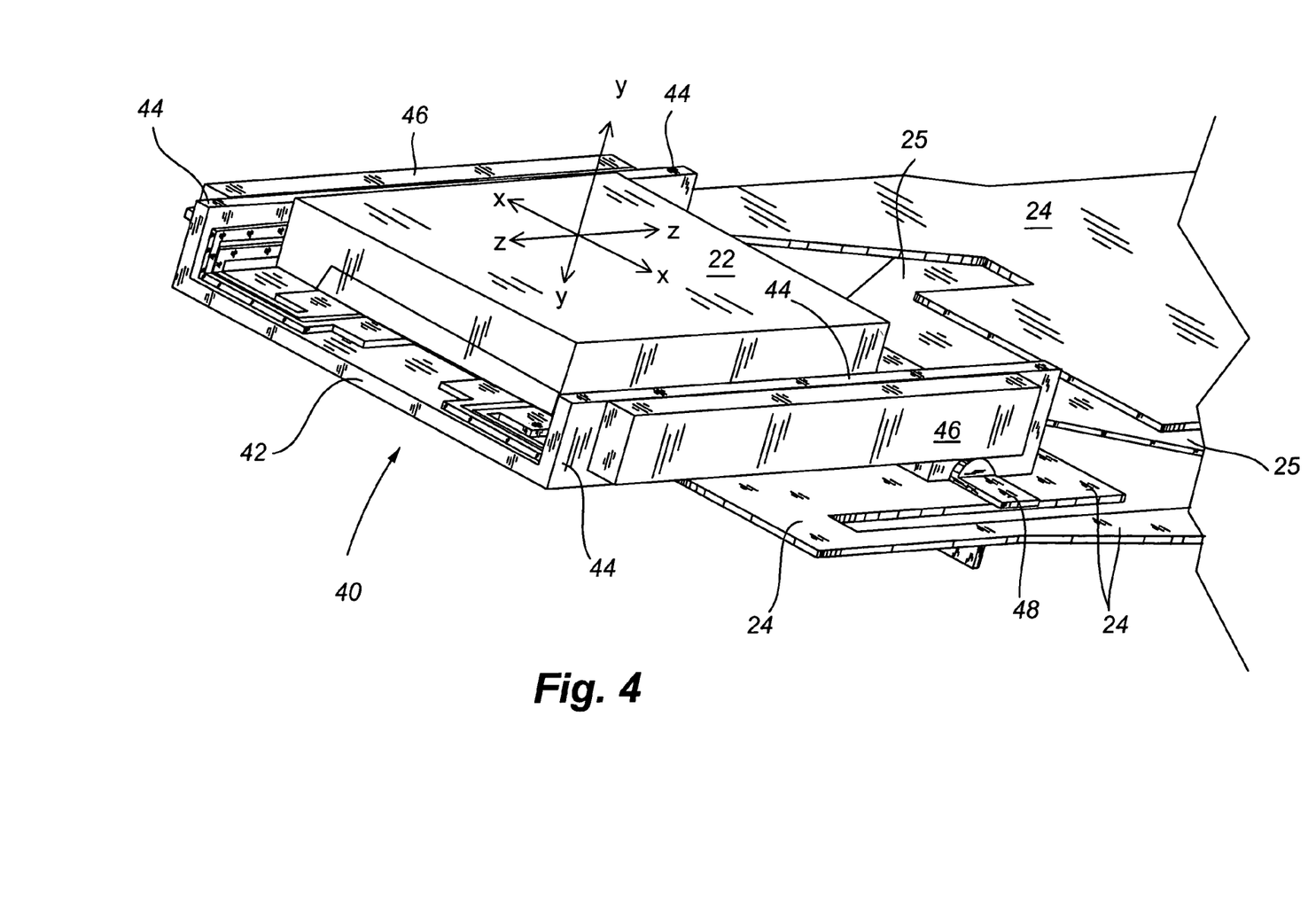
FIG. 4 is a greatly enlarged perspective view of one example of a microactuator useable in connection with the present invention.

FIG. 4 illustrates one example of a microactuator that may be used as a detection element in the present invention. The particular microactuator illustrated corresponds to one shown in a preferred embodiment of Applicant's copending application Ser. No. 10/365,184, entitled "Micro-Flexure Suspension", the disclosure of this application being hereby incorporated by reference in its entirety. In FIG. 4 the microactuator 40 is characterized by a base section 42 that secures a slider 22. A pair of reinforcing legs 44 are formed on opposite sides of the base. In the example of FIG. 4, the flexure arm or suspension arm assembly 24 attaches to a load beam 25, which in turn attaches to the actuator arm (not shown). Mounted to exterior sides of the reinforcing legs 44 are a pair of piezoelectric elements 46. In order to achieve fine positioning of the microactuator during read/write operations, voltage is applied to the piezoelectric elements through electrical bonding pads 48 formed on a transverse support adjacent each piezoelectric element. If the microactuator is to be used as a detection element in the present invention, inadvertent movement of the slider results in a force transmitted to the base 42 and reinforcing legs 44, and therefore also causes some deformation of the piezoelectric elements, thereby creating a detectable voltage spike or signal in the circuitry coupled to the piezoelectric elements.

It should also be understood that the present invention contemplates positioning of the microactuator elements at other locations other than those shown in FIG. 4, such other locations being selected to best capture inadvertent slider displacement. For example, depending upon the construction of the base and reinforcing walls, it may be desirable to place one or more piezoelectric elements on the base to further detect any slider displacement. These additional microactuator elements could be incorporated for the sole purpose of detecting displacement; therefore, processing of signals may be somewhat simplified since servo control signals are not found in the same circuit. Thus, it shall be understood that with respect to FIG. 4, the piezoelectric elements 46 illustrated there could also represent dedicated piezoelectric elements for detection of ROT events. Additionally, FIG. 4 could also represent one of the piezoelectric elements 46 being used for secondary actuation while the other piezoelectric element 46 being used solely for purposes of detecting a ROT event. It may also be desirable to position other piezoelectric elements along other portions of the actuator assembly in order to determine where the uncontrolled actuator displacement may have originated. For example, sporadic and spontaneous stress relief occurring at the connection between the actuator arm and load beam may be detected by placing a piezoelectric element at the connection.

Figure 5:
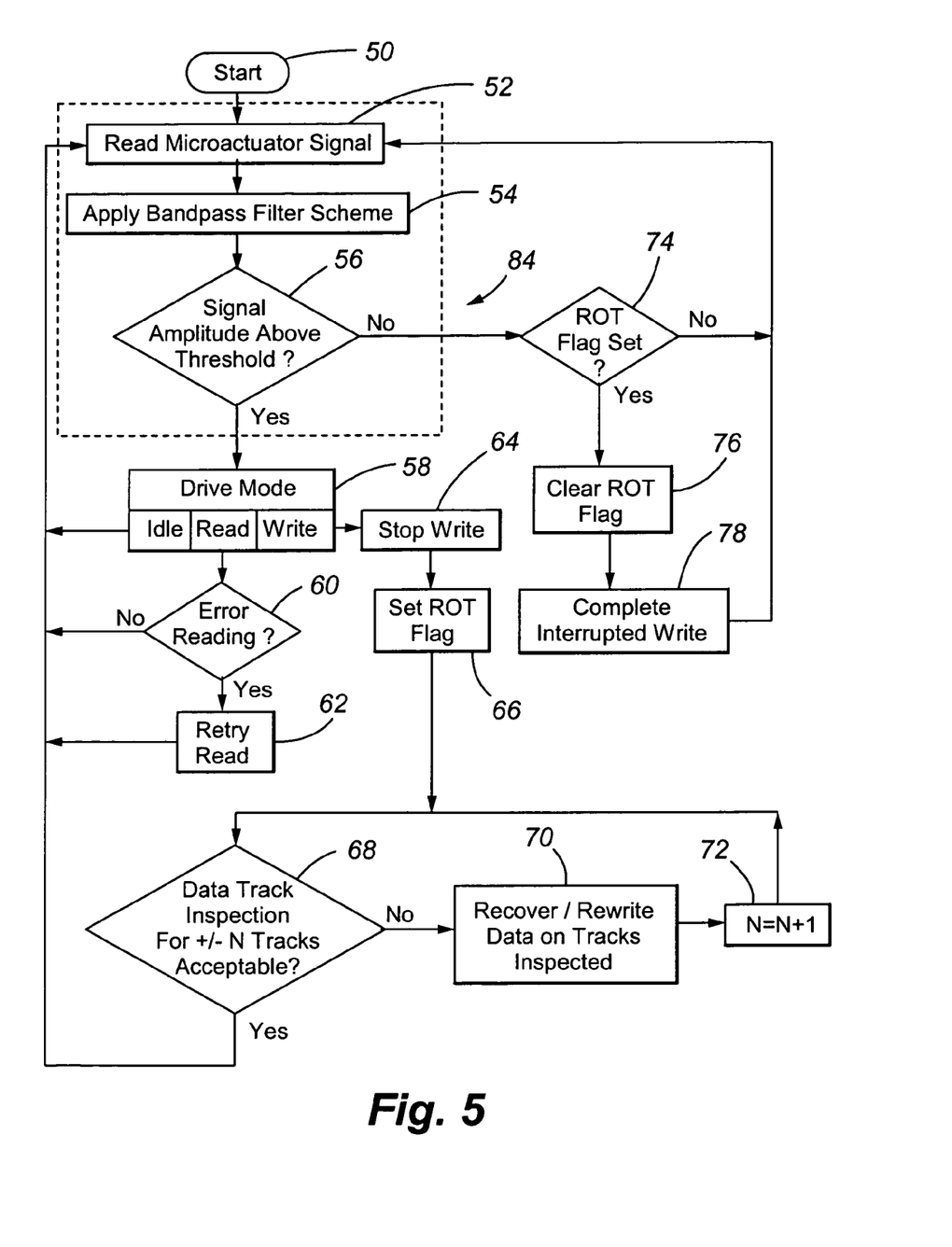
FIG. 5 is a simplified flow diagram illustrating characteristics of the present invention to include steps taken for detection and remediation of a ROT event.

FIG. 5 is a simplified flow diagram illustrating characteristics of the present invention to include steps taken for detection and remediation of a ROT event. Beginning at block 50, the disk drive is in operation and a microactuator signal is read at block 52. As discussed above, the microactuator signal is produced from one or more piezoelectric elements that may be incorporated within a disk drive for purposes of secondary actuation, or dedicated piezoelectric elements may be added to the actuator for ROT detection. At block 54, classification of the microactuator signal commences by applying an appropriate band pass filter scheme wherein a group of band pass filters are tuned to detect frequencies that correspond to ROT events. At block 56, if the resulting signal produced after applying the appropriate filters results in the signal amplitude being above a set threshold, then there is a conclusion that a ROT event has occurred, and then at block 58, the drive mode is analyzed to determine what remedial action should be taken, if any. As shown in block 58, if the ROT event occurred when the drive is idle, then no action is taken. If the ROT event occurred during a read operation, then at block 60, if an error reading occurred during the read operation, then a "retry read" command is issued at block 62 wherein the particular read sequence at issue is read again. If there is no error reading, then no further action is required. Block 84 generally corresponds to detection and classification circuitry and/or firmware used for detection and classification, as discussed further below with respect to FIG. 6.

If the detected ROT event occurred during a write command, then a "stop write" command is issued as shown at block 64, a ROT flag is set at block 66, and then an inspection procedure is undertaken to recover data that has been lost or corrupted. The ROT flag prevents further write operations until the ROT flag is removed, as discussed further below. At block 68, a sequential analysis of data tracks is conducted to determine whether the data on those tracks has been corrupted or otherwise damaged. For each track that is inspected and in which corruption or loss of data has occurred, the appropriate recover and/or rewrite command is executed with respect to the affected tracks, as shown at block 70. At block 72, the sequential analysis of the next adjacent data track is conducted to determine whether the particular track is acceptable. The inspection process continues until at least one data track is encountered without corrupted data. However, it should be understood that the sequential analysis of data tracks could continue until more than one data track was found to be acceptable. Particularly for disk drives utilizing disks having high track densities, it may be desirable to have at least two or three adjacent data tracks inspected and found as being acceptable prior to terminating the inspection process.

If the processed signal amplitude is not above the threshold, which has been determined to indicate a ROT event, then at block 74, a check is made to determine whether a ROT flag has been previously set. If no flag has been set, then drive operations continue and new microactuator signals are read as they may occur. If a ROT flag has been previously set, the ROT flag is cleared at block 76, and the previously interrupted write command is instructed to be completed, as shown at block 78. Normal drive operations may then commence.

Figure 6:
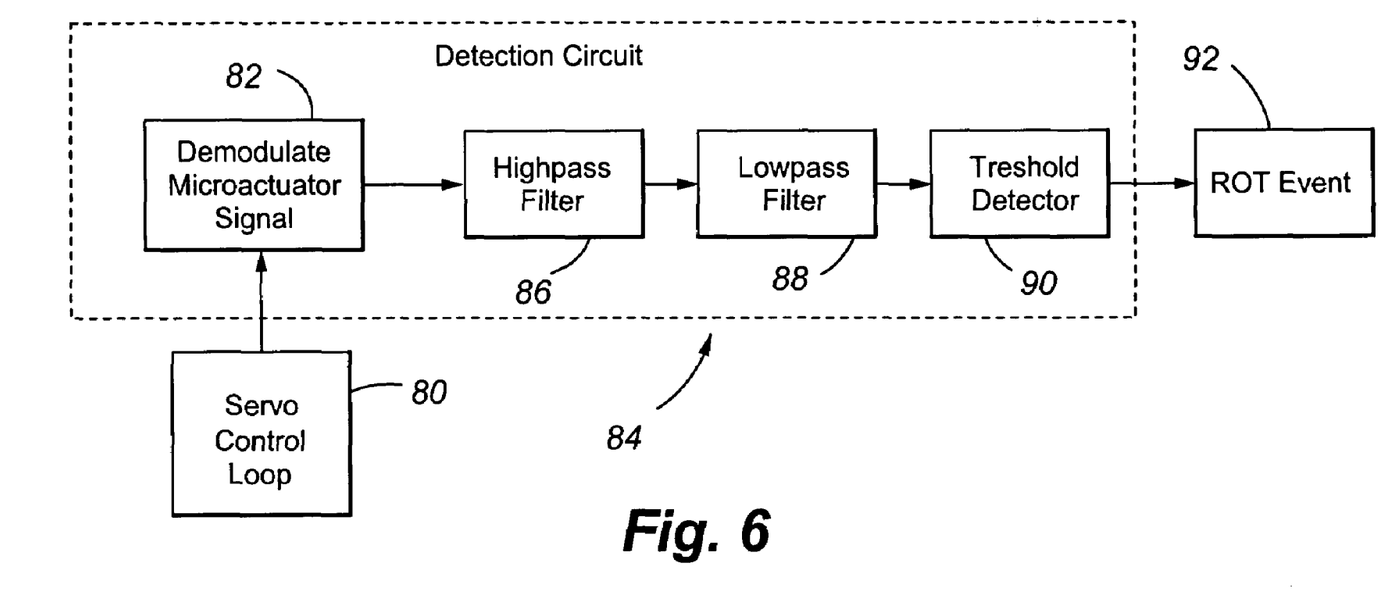
FIG. 6 is simplified schematic diagram of a detection and classification circuit that may be employed with the present invention.

Referring to FIG. 6, a simplified schematic diagram is provided of a detection and classification circuit that may be employed with the present invention. Block 80 represents the servo control loop wherein operation of the disk drive in the various read/write modes results in electronic control signals being generated, and in the case of a microactuator used as a secondary means of actuation, control signals are sent to the piezoelectric elements in the microactuator in order to achieve secondary actuation. Detected voltage signals produced by the microactuator (as caused by ROT or non-ROT events), are first demodulated at block 82. A series of band pass filters are then applied to the demodulated signal in order to classify the signal. As shown in the example of FIG. 6, a high pass filter 86 and a low pass filter 88 are utilized. The resulting signal, after being filtered, is then compared in a threshold detector 90, and if the signal has an amplitude above the preset threshold level, then a ROT flag is set indicating the perceived occurrence of a ROT event, shown in the figure as ROT event 92. As discussed above with respect to FIG. 5, if it is determined that a ROT event has occurred, the drive mode is analyzed, and the appropriate remedial actions are taken.

It should be understood that there are also other remedial actions that can be undertaken in accordance with particular functionality incorporated within disk drive software/firmware and/or circuitry. For example, a signal may be provided to the servo control loop 80 in order to remediate any track misregistration that may have occurred. Additionally, occurrences of ROT events may be stored in a memory element of the disk drive, and such events could be incorporated in a user accessible database that recorded signal characteristics of the ROT events to include the various signal parameters such as the frequency, amplitude, and duration of the events. By recording and cataloging the ROT events, it may be possible to provide some predictive analysis in terms of predicting and/or preventing ROT events caused by one or more observed environmental factors or disk drive operating conditions.

Some disk drives may utilize a voice coil as a microactuator element. Accordingly, it is also possible to use such a voice coil as a detector of certain events to include shock events. Displacements of the actuator in this case can be detected as back-EMF generated by the voice coil. However, it has been found that with respect to ROT events, voice coils are not acceptable as detectors because there is an inherent delay in the production of the back-EMF signal that therefore prevents the back EMF from being timely detected and classified.

While the present invention has been set forth above with respect to preferred embodiments in both an apparatus/system and method, it shall be understood that other changes and modifications can be made within the spirit and scope of the invention commensurate with the scope of the claims appended hereto.

What is claimed is:

1. A disk drive detection system for detecting rapid off track events occurring in a disk drive, said system comprising:

an actuator assembly including a microactuator, said actuator assembly being movable with respect to a disk of the disk drive for writing data to and reading data from respective tracks on the disk, said microactuator including at least one piezoelectric element producing a voltage signal in response to a rapid off track event;

a detection circuit for detecting an off track event, said detection circuit analyzing the voltage signal produced from said piezoelectric element and comprising:
(i) a demodulator for processing the voltage signal produced by said piezoelectric element, (ii) a high frequency band pass filter, (iii) a low frequency band pass filter, said filters for isolating signal frequencies indicative of a rapid off track event, and (iv) at least one threshold detector for comparing said signal frequencies to a threshold for determining whether a rapid off track event has occurred; and means for remediating an error condition caused by the rapid off track event, said means for remediating including at least one of a software or firmware application incorporated in said disk drive wherein a drive mode of said disk drive is analyzed for read/write errors caused by said rapid off track event.

2. A system, as claimed in claim 1, wherein:
said detection circuit detects whether said voltage signal occurs within a one millisecond duration.

3. A system, as claimed in claim 1, wherein:
said detection circuit detects whether said voltage signal has a frequency in the range of between about 10-30 kilohertz.

4. A system, as claimed in claim 1, wherein:
said means for remediating further comprises a set rapid off track (ROT) flag command if said voltage signal amplitude is above a set threshold.

5. A system, as claimed in claim 1, wherein:
said means for remediating further comprises a set rapid off track (ROT) flag command, a stop write command, and a data track inspection command for data tracks potentially affected by the event.

6. A system, as claimed in claim 1, wherein:
said means for remediating further includes commands generated for recovering and rewriting data on tracks inspected containing errors due to the rapid off track event.

7. A method for detecting and remediating rapid off track events (ROTs) occurring in a disk drive, said method comprising the steps of:
reading a voltage signal produced by a microactuator incorporated within an actuator assembly of the disk drive;
conditioning the voltage signal by demodulating with a demodulator, filtering with a high frequency band pass filter, filtering with a low frequency band pass filter, said filters isolating frequencies of the voltage signal indicative of a rapid off track event, and comparing the voltage signal at the isolated frequencies to a threshold value to determine the presence of the event;
determining a drive mode when the event occurred;
issuing a stop write command, and setting a ROT flag if the event occurred during a write mode;
retrying a read function if the event occurred during a read mode resulting in a read error; and
clearing the ROT flag as a function of the voltage signal as conditioned by the step of conditioning.

8. A method, as claimed in claim 7, further including the steps of:
identifying at least one track accessed during the event;
inspecting the track and sequentially inspecting N tracks surrounding the track to determine the existence of corrupted data; and
generating recover commands to include rewrite commands as necessary to remediate corrupted data tracks found during said inspecting step.

9. A disk drive detection system for detecting rapid off track events occurring in a disk drive, said system comprising:
a microactuator movable with respect to a disk of the disk drive for writing data to and reading data from respective tracks on the disk, said microactuator including at least one piezoelectric element responsive to control signals produced by said disk drive for causing said piezoelectric element to position said microactuator along a desired track of the disk, said piezoelectric element further being responsive to occurrence of a rapid off track event wherein said piezoelectric element produces a voltage signal in response to the rapid off track event;

a detection circuit configured for detecting a rapid off track event, said detection circuit analyzing the voltage signal produced by said piezoelectric element and comprising:
(i) a demodulator for processing the voltage signal produced by said piezoelectric element, (ii) a high frequency band pass filter, (iii) a low frequency band pass filter, said filters isolating frequencies of the voltage signal indicative of a rapid off track event, and (iv) at least one threshold detector for comparing the voltage signal at the isolated frequencies to a threshold to determine whether a rapid off track event has occurred; and at least one of a software or firmware application incorporated in said disk drive wherein a drive mode of said disk drive is analyzed for read/write errors caused by said rapid off track event.

10. A system, as claimed in claim 9, wherein:
said detection circuit analyzes whether the voltage signals from said microactuator occurs within a one millisecond duration.

11. A system, as claimed in claim 9, wherein:
said detection circuit analyzes whether the voltage signal from said piezoelectric element has a frequency in the range of between about 10-30 kilohertz.

12. A system, as claimed in claim 9, wherein:
said firmware/software comprises a set rapid off track (ROT) flag command if said voltage signal has an amplitude above a set threshold.

13. A system, as claimed in claim 9, wherein:
said firmware/software comprises a set rapid off track (ROT) flag command, a stop write command, and a data track inspection command for data tracks potentially affected by the event.

14. A system, as claimed in claim 9, wherein:
said firmware/software further includes commands generated for recovering and rewriting data on tracks inspected containing errors due to the rapid off track event.

15. A method for detecting and remediating rapid off track events occurring in a disk drive, said method comprising the steps of:
reading a voltage signal produced by a piezoelectric element incorporated within an actuator assembly of the disk drive;
conditioning the voltage signal by demodulating with a demodulator, filtering with a high frequency band pass filter, filtering with a low frequency band pass filter, said filters isolating frequencies of the voltage signal indicative of a rapid off track event, and comparing the voltage signal at the isolated frequencies to a threshold value to determine the presence of the event;

determining a drive mode when the event occurred;

issuing a stop write command, and setting a rapid off track (ROT) flag if the event occurred during a write mode;

retrying a read function if the event occurred during a read mode resulting in a read error; and clearing the ROT flag as a function of the voltage signal as conditioned by the step of conditioning.

16. A method, as claimed in claim 15, further including the steps of:

identifying at least one track accessed during the event;

inspecting the track and sequentially inspecting N tracks surrounding the track to determine the existence of corrupted data; and conducting recover and rewrite operations to remediate corrupted data tracks found.

17. A method, as claimed in claim 15, wherein:

said piezoelectric element is incorporated within a microactuator used for fine positioning of an actuator of the disk drive.

18. A method, as claimed in claim 15, wherein:

said piezoelectric element includes a piezoelectric element dedicated for responding to uncontrolled movements of an actuator in the disk drive, said piezoelectric element not being incorporated within a microactuator of the disk drive.

19. A method, as claimed in claim 15, wherein:

said piezoelectric element includes a plurality of piezoelectric elements, at least one of said piezoelectric elements being incorporated within a microactuator of the disk drive, and another piezoelectric element of said plurality of piezoelectric elements being a dedicated piezoelectric element not receiving servo control signals from the disk drive for positioning of the actuator assembly.

20. A method for detecting and remediating rapid off track events (ROTs) occurring in a disk drive, said method comprising the steps of:

reading a voltage signal produced by a piezoelectric element incorporated within an actuator assembly of the disk drive;

determining whether a ROT event has occurred by analyzing said voltage signal, said ROT event being characterized as an uncontrolled displacement of said actuator with respect to a disk of the disk drive wherein said rapid off track event occurs in a time span of within about one millisecond, and a frequency of said rapid off track event is in a range of between about 10-30 kilohertz, wherein analyzing comprises conditioning the voltage signal by demodulating with a demodulator, filtering with a high frequency band pass filter, filtering with a low frequency band pass filter, said filters isolating frequencies of the voltage signal indicative of a rapid off track event and comparing the voltage signal at the isolated frequencies to a threshold value to determine the presence of the event;

determining a drive mode when the rapid off track event occurred;

issuing a stop write command, and setting a ROT flag if the event occurred during a write mode;

retrying a read function if the event occurred during a read mode resulting in a read error; and clearing the ROT flag as a function of the voltage signal as conditioned by the step of conditioning.

21. A method, as claimed in claim 20, further including the steps of:

identifying at least one track accessed during the rapid off track event;

inspecting the at least one track, and subsequently inspecting N tracks surrounding the at least one track to determine the existence of corrupted data on said N tracks; and generating recover commands including rewrite commands as necessary to remediate corrupted data tracks found during said inspecting step.

* * * * *